United States Patent [19]
Cutler

[11] Patent Number: 5,419,273
[45] Date of Patent: May 30, 1995

[54] PORTABLE MARINE SHELTER

[75] Inventor: Harrison Cutler, Hampstead, Canada

[73] Assignee: Tunnelo Industries, Montreal, Canada

[21] Appl. No.: 301,493

[22] Filed: Sep. 7, 1994

[51] Int. Cl.$^6$ ............................................. B63B 35/44
[52] U.S. Cl. ...................................... 114/263; 135/97
[58] Field of Search ..................... 114/263; 405/219; 135/97

[56] References Cited

U.S. PATENT DOCUMENTS

| | | |
|---|---|---|
| 1,643,464 | 9/1927 | McCullers . |
| 2,887,975 | 5/1959 | Smith .................................. 114/263 |
| 2,984,076 | 5/1961 | Bradley . |
| 4,066,089 | 1/1978 | Rainwater ............................ 135/3 E |
| 4,070,979 | 1/1978 | Otis et al. ............................ 114/263 |
| 4,556,002 | 12/1985 | Georgii ................................ 114/264 |
| 4,683,901 | 8/1987 | Mitchell .............................. 135/97 |
| 4,979,456 | 12/1990 | Steward .............................. 114/351 |

Primary Examiner—Jesus D. Sotelo

[57] ABSTRACT

A portable marine shelter that includes a frame assembly having two lower spaced apart longitudinally extending members, or float bars, and a flexible cover that fits over the frame assembly to provide an enclosure to store a boat and the like. A floatation system includes numerous sphere-shaped floats that are rotatably attached to the lower frame members, the floats are also free to move longitudinally along predetermined sections of the lower frame members. The floats are substantially equally distributed between the two lower members and along each individual member. The loosely attached floats enables the shelter to accommodate wave and wind generated motion without unduly stressing the frame assembly of the boat sheltered therein. The entire shelter is loosely attached to a dock and loosely anchored to the bottom of the lake, etc. to provide a structure that securely protects a boat yet is capable of being moved easily to different locations.

15 Claims, 2 Drawing Sheets

PORTABLE MARINE SHELTER

FIELD OF THE IVNENTION

This invention relates to the field of portable marine shelters, and more particularly, to a shelter suited to protect small pleasure craft and the like on the water.

BACKGROUND OF THE INVENTION

The sheltering of boats presents many problems not encountered in conventional structures. Permanent boat houses can be very expensive due to the terrain encountered along the shoreline, and can be destructive to the environment.

As a result of the problems associated with permanent boat houses, various floating type structures have been proposed in the prior art. Many such structures involve the use of a floating boat dock which is tied to the shoreline and is then covered by a conventional land based shelter. However, covering floating docks with a land based type shelter does not accommodate rising and falling tides, winds and turbulent water making such rigid structures impractical for covering boats.

The prior art has attempted to incorporate some built-in resiliency to avoid stress on land based type shelters supported on floating docks. For example, U.S. Pat. No. 1,643,464 issued Sep. 27, 1927 discloses a floating dock having a plurality of sections that could be bolted together to support an aluminum roof. Two spaced floats supported the structure when assembled. This type of structure is generally unsatisfactory, however, due to the weight and permanence of the structure. It cannot be easily assembled and moved and the dock portion remains highly susceptible to rocking in waves and wind that can damage the boat being sheltered.

Consequently, it would be desirable to provide a portable marine shelter that is easy to assemble and install on the water surface, and to provide a floatation system that can accommodate wave and wind generated motion without unduly stressing the boat sheltered therein.

SUMMARY OF THE INVENTION

An object of the present invention is to provide a portable marine shelter that is easy to assemble and install on a water surface and be capable of accommodating wave and wind generated motion without unduly stressing the shelter of a boat located therein.

In accordance with one aspect of the invention there is provided a portable marine apparatus comprising an elongate frame assembly having a pair of lower spaced apart longitudinally extending members, said frame assembly adapted to support a flexible cover to produce an enclosure for sheltering a boat on a water surface; and a plurality of floatation devices connected to each of the lower members of the frame assembly, said floatation devices being free to rotate about the lower members and being free to slide longitudinally along a predetermined section of the lower members, said floatation devices being substantially evenly distributed between the pair of lower members, wherein the floatation devices provide sufficient buoyancy to support the total weight of frame and cover on the surface of the water.

In accordance with another aspect of the present invention there is provided a portable marine apparatus comprising an elongate frame assembly having a pair of lower spaced apart longitudinally extending members, said frame assembly adapted to support a flexible cover to produce an enclosure for sheltering a boat on a water surface; and floatation devices substantially equally distributed and connected to each of the pair of lower members of the frame assembly, said floatation elements being so numerous in number to provide adequate buoyancy and to enable the frame to accommodate wave generated motion.

BRIEF DESCRIPTION OF THE DRAWINGS

Embodiments of the invention will be described by way of example in conjunction with the drawings in which.

DETAILED DESCRIPTION OF EMBODIMENTS OF THE INVENTION

Figure 1:
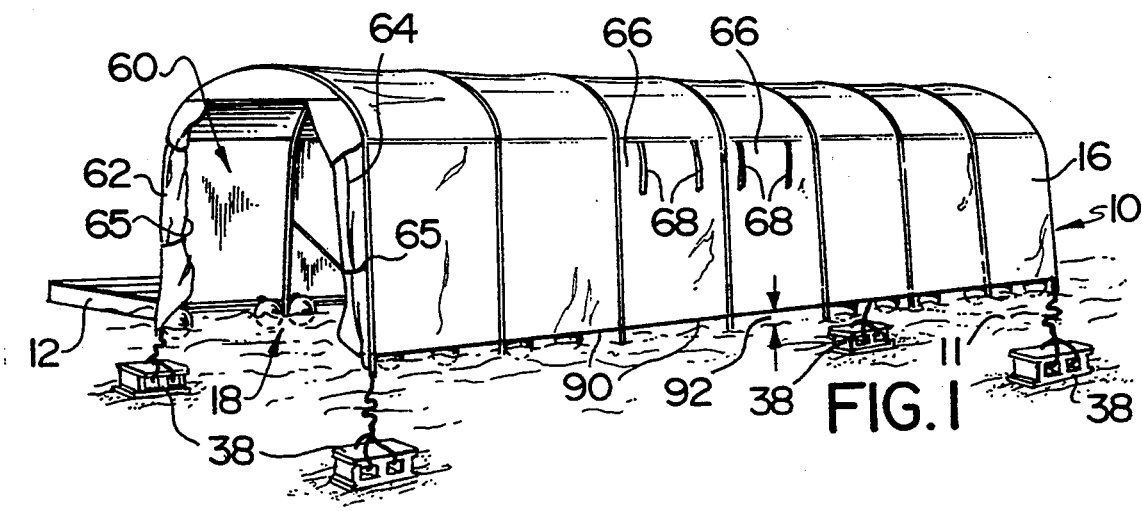
FIG. 1 illustrates a perspective view of a portable marine shelter according to one embodiment of the present invention.

FIG. 1 illustrates a portable marine shelter 10 floating on a water surface 11 anchored to a dock 12 according to an embodiment of the present invention. The shelter 10 includes a frame assembly 14, a cover 16, and a floatation system 18.

Figure 2:
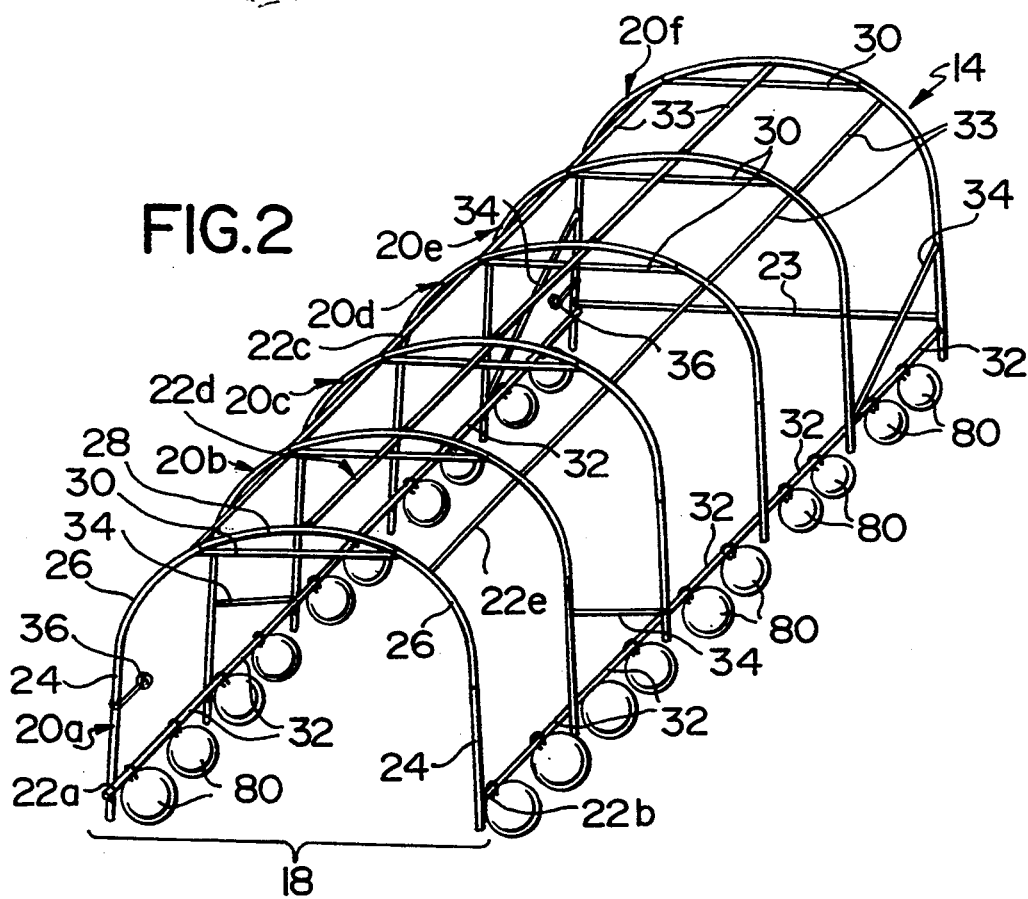
FIG. 2 illustrates a perspective view of a frame assembly and floatation system according to another embodiment of the present invention.

The frame assembly 14, an embodiment of which is illustrated in FIG. 2, includes a plurality of arch units 20a–20f interconnected in a spaced relation by two longitudinal floatation connecting units 22a and 22b and three longitudinal frame connecting units 22c–e.

Each arch unit 20(a–f) consists of two vertical arch members 24, each being connected at one end to a curved side arch members 26. The side arch members 26 are connected together by a curved top arch member 28 and a straight arch member 30.

The floatation connecting units 22a,b each include a plurality of connected floatation attachment members 32. The frame connecting units 22c–e each include a plurality of connected frame members 33. The floatation connecting units 22a and 22b are connected near the base of vertical arch members 24 of the arch units 20(a–f). The connecting units 22c and 22e are connected to the arches 20(a–f) at a point on the curved side arch members 26. A connecting unit 22d is attached to the top of the curved tip arch members 28. A lateral connecting member 23 is connected near the bottom of the straight arch members 30 at arch 20f.

Frame reinforcing members 34 are connected to the vertical arch members 24 on both sides between arch unit 20b and 20c, and between arch units 20e and 20f.

Figure 3:
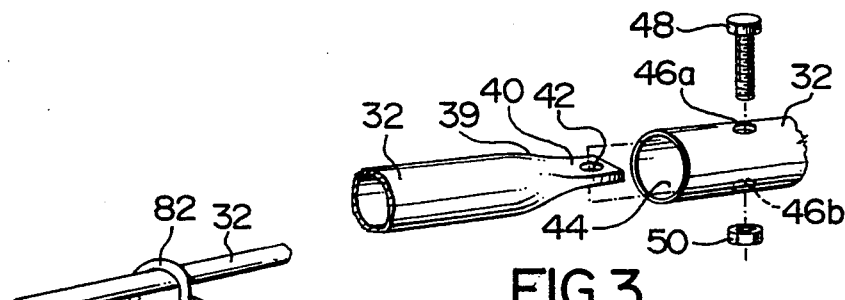
FIG. 3 illustrates an exploded view of the connection of two floatation attachment members.

FIG. 3 illustrates the interconnection of the floatation attachment members 32 to form one of the longitudinal floatation connecting units 22a,b. The member 32 includes a reduced diameter section 39 and a protruding tongue 40 having an aperture 42 defined therein at one end, and a receiving opening 44 at the other end. The end with the receiving opening 44 includes a pair of coincident apertures 46a,b. The members 32 are secured to each other by inserting the reduced diameter section 39 into the receiving opening 44 of another member 32 to produce a friction fit between the two members 32. To securely attach the two members a bolt 48 is inserted into the aperture 46a, through the aperture 42 of the tongue 40 and extends out of the aperture 46b. A nut 50 is rotated onto the protruding end of the bolt 48 to secure the connection. The interconnection of the other members is accomplished in a similar way, i.e. the connection of members 33, the connection of member 24 to 26, and 26 to 28 etc. Members 33 are connected directly to members 26 by means of a bolt that passes through both members and securing the bolt with a nut in a manner commonly known in the prior art.

The cover 16 is made from a high density lightweight synthetic material. The material is ultra-violet protected and sun reflective to protect the finish of a boat that is stored in the shelter 10. In the embodiment shown in FIG. 1, the shelter 10 includes a primary door 60 consisting of two side panels 62 and 64 that separate to provide an opening such that a boat can be driven into the shelter 10. The side panels 62 and 64 are hung on a cross bar (not shown) and can be pulled together and tethered using rope or other fasteners 65.

The cover 16 can also be provided with two side doors 66 located at both sides of the shelter 10 to enable exit from the boat directly onto the dock 12. The side doors 66 can be rolled up and secured using fasteners 68.

The cover 16 is attached to the floatation attachment members 32 by means of string/ropes/elastic cord (not shown) etc. Bottom side edges 90 of the cover 16 are located approximately six inches above the floatation connection units 22a,b. When the shelter 10 is placed in the water, the frame 14 will generally sink approximately three inches leaving a three inch clearance 92 between the surface of the water 11 and the bottom side edges 90 to facilitate air circulation through the shelter 10.

Figure 4:
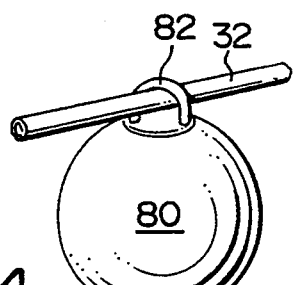
FIG. 4 illustrates a perspective view of a float sphere positioned on a floatation attachment member.

The floatation system 18 includes a plurality of individual floatation spheres 80, each having an integrated loop fastener 82. The floats 80 are installed onto the individual floatation members 32 prior to attachment to the arch units 20(a–f) by inserting a member 32 into the loop 82 as illustrated in FIG. 4.

The floatation system 18 must provide at least enough buoyancy force to support the weight of the frame assembly 14 and cover 16. However, it is preferable that the buoyancy force be at least three times the total weight of the frame assembly 14 and the cover 16. This will maintain the shelter essentially above the water line during wave and wind generated motion.

With the cover 16 installed over the frame assembly 14 the floats 80 are free to rotationally move about the member and longitudinally along the member. The rotational movement is limited by the cover 16 and water surface 11, and the longitudinal movement is limited by the vertical arch members 24. This ensures that the floats 80 maintain a generally even distribution along both connecting units 22a,b.

Although, the floats 80 are shown in FIG. 1 as being located within the shelter 10 to provide bumpers for boats located therein, other arrangements are also possible. For example, the floats 80 can be located either inside or outside of the cover or a combination of both. Further, as shown in FIG. 1, the floats 80 can be distributed along units 22a,b in groups to provide a void where the side doors 66 are located to facilitate a simple entry to and exit from the shelter 10.

In use, for practical purposes, the shelter 10 is attached to the dock 12 at one side by two unfettered (loosely/with slack) lines, one at the front and the other at the back of one side of the shelter 10. For additional protection the shelter 10 is anchored using concrete blocks 38, well covers and the like at each of the four corners of the shelter 10. The blocks 38 are connected using slack lines to accommodate fluctuations in the vertical position of the shelter 10 on the water surface 11.

The boat is moored directly to the shelter by using a pair of mooring collars 36, which are attached to the vertical arch members 24 at the front and back of the frame 14. This arrangement allows the shelter 10 and the boat stored therein to move freely on the water surface 11 to absorb wave and wind generated motion.

Figure 5:
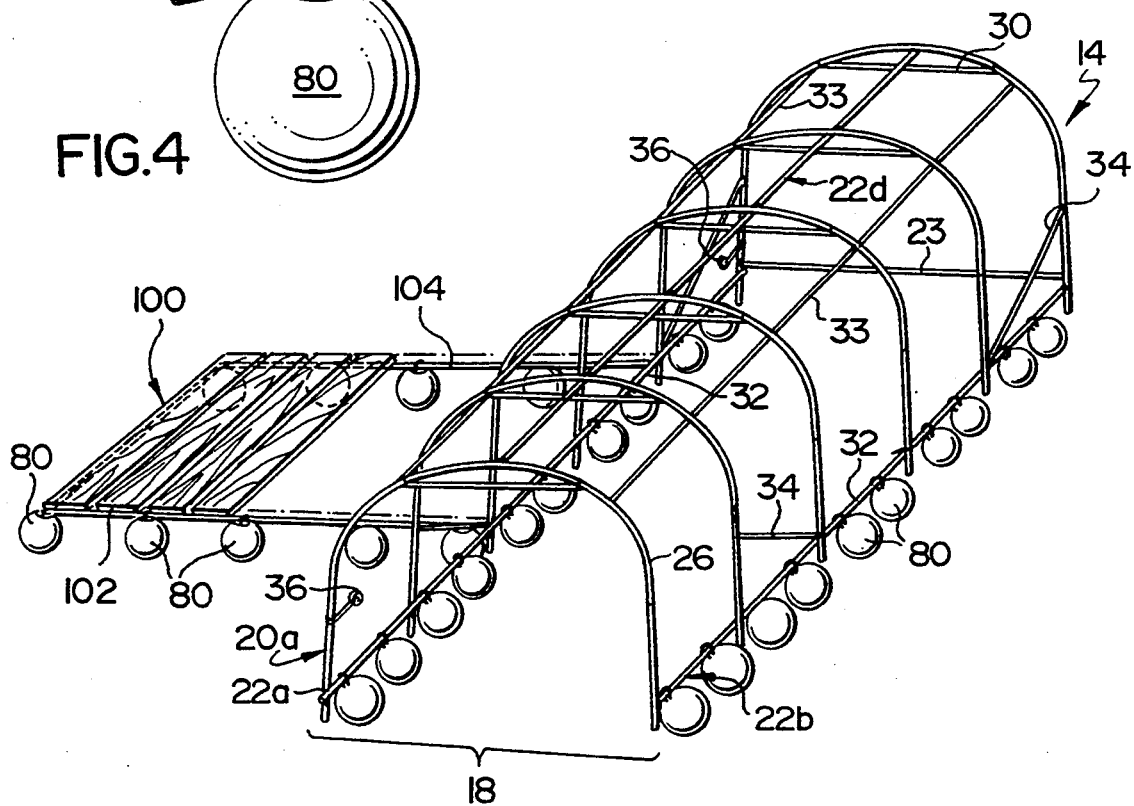
FIG. 5 illustrates a perspective view of a portable marine shelter having an integrated stepping dock according to another embodiment of the present invention.

FIG. 5 illustrates another embodiment of the present invention in which the shelter 10 includes a stepping dock 100 supported by a plurality of floats 80 and connected to the frame assembly 14 of the shelter 10. This arrangement allows the shelter 10 to be anchored by blocks 38 in relatively shallow water to permit entry and exit from the shelter 10 by using the stepping dock 100. The stepping dock 90 includes a plurality of wooden planks 102 secured to a frame work 104.

The shelter 10 can be easily transported to different docks and can also be completely disassembled and moved to a different location. In particular, the shelter 10 can be moved from the water surface 11 to the land if the shelter 10 is used in cold climate locations where the water freezes during the winter.

I claim:

1. A portable marine apparatus comprising an elongate frame assembly having a pair of lower spaced apart longitudinally extending members, said frame assembly adapted to support a flexible cover to produce an enclosure for sheltering a boat on a water surface; and a plurality of floatation devices connected to each of the lower members of the frame assembly, said floatation devices being free to rotate about the lower members and being free to slide longitudinally along a predetermined section of the lower members, said floatation devices being substantially evenly distributed between the pair of lower members, wherein the floatation devices provide sufficient buoyancy to support the total weight of frame and cover on the surface of the water.

2. The apparatus of claim 1, wherein the floatation devices are substantially evenly distributed on each one of the lower members of the frame assembly.

3. The apparatus of claim 2, wherein the floatation devices are sphere-shaped floats having a loop fastener adapted to receive one of the pair of lower members.

4. The apparatus of claim 3, further includes means for loosely anchoring the apparatus to a location on the water surface.

5. The apparatus of claim 1, wherein the cover includes side portions located proximate and attached to the pair of lower members, said side portions being positioned such that when the apparatus is on the water surface a clearance exists between the water surface and the side portions to permit air to circulate throughout the enclosure.

6. The apparatus of claim 5, wherein a majority of the floatation devices are located within the enclosure.

7. The apparatus of claims 5, wherein the floatation devices are substantially equally distributed between the inside and the outside of the enclosure.

8. The apparatus of claim 5, wherein the cover includes at least one door means.

9. The apparatus of claim 1, further including mooring collars connected to the frame assembly.

10. A portable marine apparatus comprising an elongate frame assembly having a pair of lower spaced apart lonqitudinally extendinq members, said frame assembly adapted to support a flexible cover to produce an enclosure for sheltering a boat on a water surface; and a plurality of floatation devices substantially equally distributed and connected to each of the pair of lower members of the frame assembly, wherein said floatation devices are free to rotate about the lower members and are free to slide longitudinally along a predetermined section of the lower members, wherein the floatation devices provide buoyancy sufficient to enable the frame to accommodate wave generated motion.

11. The apparatus of claim 10, wherein the floatation devices are sphere-shaped floats having a loop fastener adapted to receive one of the pair of lower members.

12. The apparatus of claim 10, wherein a majority of the floatation devices are located within the enclosure.

13. The apparatus of claim 10, further includes means for loosely anchoring the apparatus to a location on the water surface.

14. The apparatus of claim 10, further including a platform means attached to one of the lower members of the frame assembly to permit entry to and exit from the enclosure.

15. The apparatus of claim 14, wherein the platform means includes a platform frame assembly, a surface member connected to the platform frame assembly, and a plurality of floatation devices spaced around the periphery of the platform frame assembly to support the platform means.

* * * * *